UNITED STATES PATENT OFFICE.

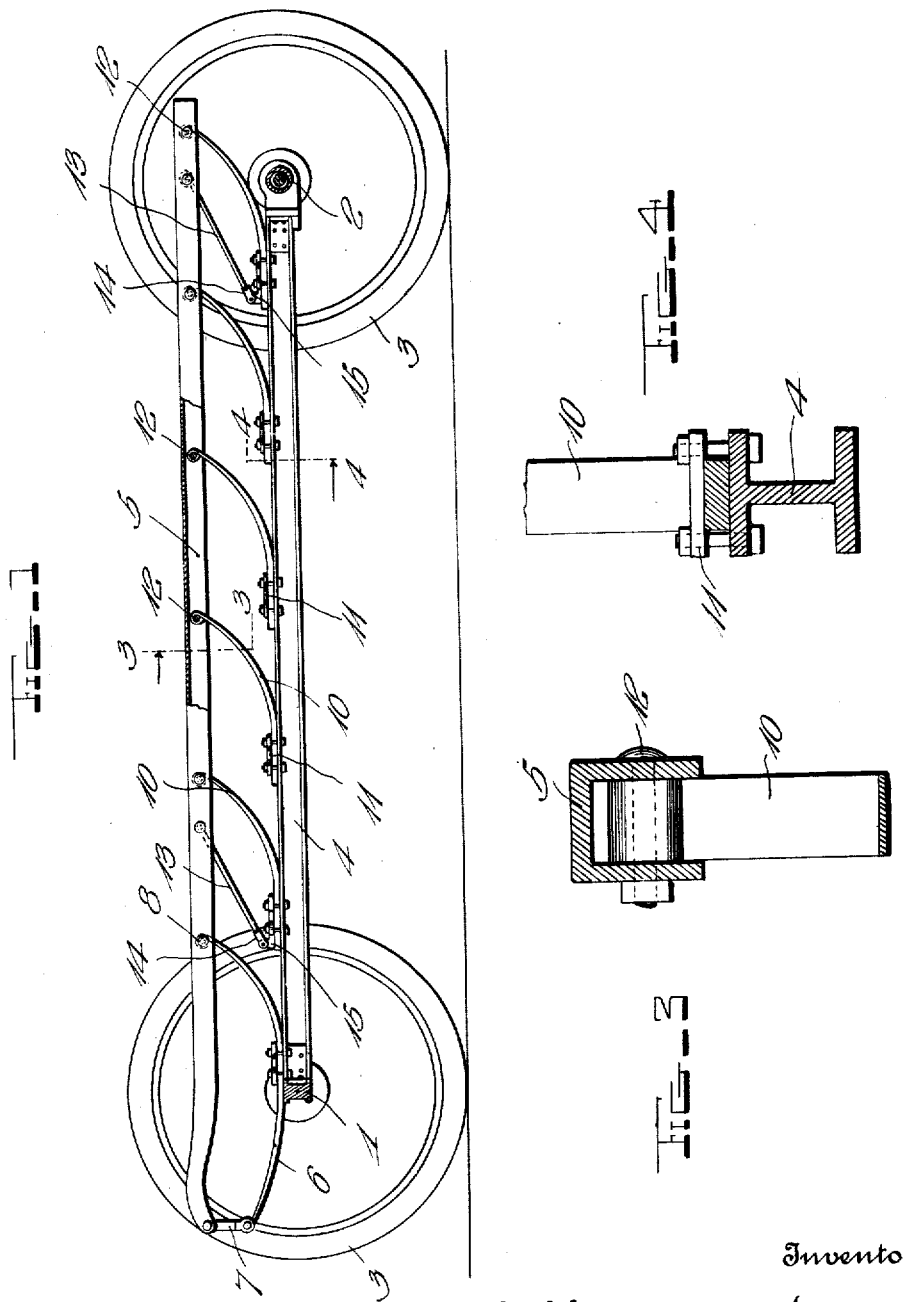

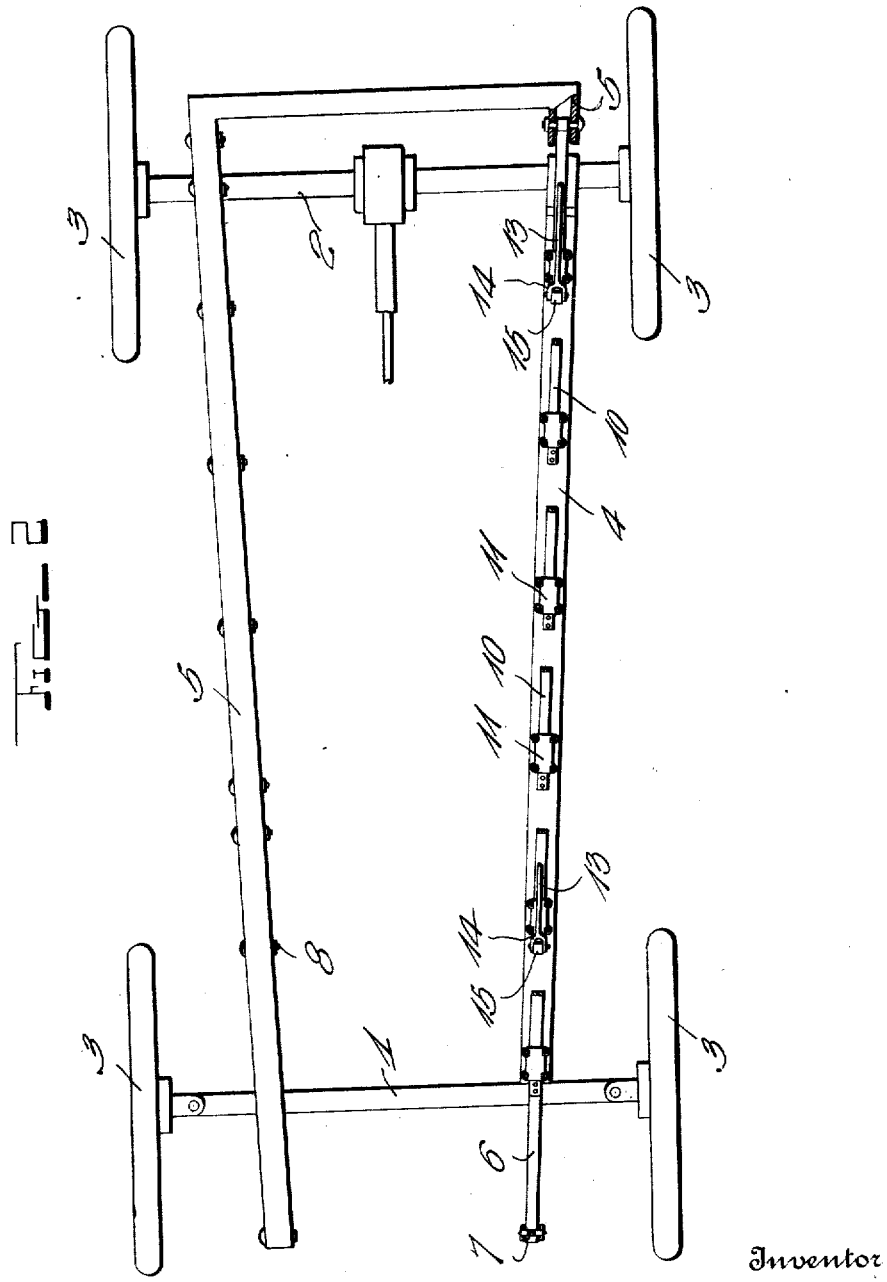

CHRIST WESTERGARD, OF DENBIGH, NORTH DAKOTA.

SPRING-MOUNTING FOR VEHICLE-BODIES.

1,292,939.  Specification of Letters Patent.  Patented Jan. 28, 1919.

Application filed December 6, 1917. Serial No. 205,854.

*To all whom it may concern:*

Be it known that I, CHRIST WESTERGARD, a citizen of the United States, residing at Denbigh, in the county of McHenry and State of North Dakota, have invented certain new and useful Improvements in Spring-Mountings for Vehicle-Bodies; and I do declare the following to be a full, clear, and exact description of the invention, such as will enable others skilled in the art to which it appertains to make and use the same.

My invention relates to improvements in spring mountings for vehicle bodies, and has for its principal object to provide a mounting which will equally distribute relative movement of the vehicle body and running gear throughout the length of both.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a side elevation partly in section showing the application of the improved spring mounting;

Fig. 2 is a top plan view, partially in horizontal section.

Figs. 3 and 4 are detail transverse, vertical sections taken respectively on lines 3—3 and 4—4 of Fig. 1.

In the drawings above briefly described, the numerals 1 and 2 designate respectively the front and rear axles of an automobile chassis, said axles having the usual wheels 3 which may be equipped with solid rubber tires if required, due to the extreme resiliency of the improved spring mounting yet to be described.

A pair of longitudinal stringers 4 of any suitable construction, extend between the front and rear axles and are rigidly secured to both, said stringers being located beneath the usual side bars 5 of the automobile chassis, said bars being by preference constructed of channel metal with their channeled sides disposed downwardly, in order that the springs and links yet to be described may have their upper ends mounted in the channels.

The usual semi-elliptical springs 6 are disposed between the front ends of the stringers 4 and bars 5, the front terminals of said springs being preferably connected with the bars 5, by vertical links 7 which are pivotally mounted, whereas the rear ends of said springs are pivoted at 8 to said bars, the usual spring clips being employed for securing the springs to the axle 1 or to the stringers 4 as occasion may require. In rear of the springs 6, a plurality of cantaliver springs 10 are interposed between the stringers 4 and the side bars 5, the lower front ends of said springs being secured by clips or the like 11 to said stringers, whereas the upper ends thereof are received in the channels of the bars 5 and are pivoted therein as shown at 12.

In order that all of the springs may act equally in absorbing shocks and jars, parallel links 13 extend between the bars 5 and the stringers 4, said links inclining in the same direction as the springs 10, that is upwardly and rearwardly in the present showing, although all of these parts could well incline in the opposite direction should occasion demand. The upper ends of the links 13 are received in the channels of the side bars 5, but the lower ends thereof are preferably forked as shown at 14 and pivoted to bosses 15 which are formed on the crowns of certain of the spring clips 11. Although this construction is preferable, it will be obvious that any other suitable arrangement could well be employed.

From the foregoing, taken in connection with the accompanying drawings, it will be obvious that the improved spring equipment may be applied to numerous styles and makes of motor and other vehicles, or that these vehicles may be built at the factory with the improved features. Regardless of its use, the improved spring system will be highly efficient and durable, serving to equally distribute any shocks and jars throughout the entire set of springs, so that relative movement of the body and running gear will be equalized throughout the lengths of both. This will cause an extremely easy-riding vehicle whose body will have a free floating movement rather than the jerky movement now existing on vehicles having the usual spring arrangement.

Since probably the best results are obtained from the several specific features of construction shown and described, these features constitute the preferred embodiment of the improved spring mounting. I wish it understood, however, that within the scope of the invention as claimed, numerous minor changes may well be made without sacrificing the principal advantages.

I claim:

1. In combination with a vehicle running gear including longitudinal stringer members extending from one axle to the other, and a body support including longitudinal side members above said stringer members, a plurality of cantaliver springs disposed at longitudinally spaced points between said stringer members and said side members, said springs all extending in the same direction and being operatively connected to said members.

2. In combination with a vehicle running gear including longitudinal stringer members extending from one axle to the other, and a body support including longitudinal side members above said stringer members, semi-elliptic springs secured between their ends to the front ends of said stringer members and pivoted at their rear ends to said side members, links pivotally connecting the front ends of said springs with said side members, a plurality of cantaliver springs disposed at longitudinally spaced points between said stringer and side members and all extending in the same direction, means securing one end of said cantaliver springs to one set of said members, and pivotal connections between the other members and the other ends of said cantaliver springs.

3. A structure as specified in claim 1, together with links extending between and pivoted to said stringer and side members, said links extending in the same direction as said cantaliver springs.

In testimony whereof I have hereunto set my hand in the presence of two subscribing witnesses.

CHRIST WESTERGARD.

Witnesses:
 ANDREW WESTERGARD,
 A. P. SIMONSON.

Copies of this patent may be obtained for five cents each, by addressing the "Commissioner of Patents, Washington, D. C."